(12) United States Patent
Shimoyama et al.

(10) Patent No.: US 11,513,102 B2
(45) Date of Patent: Nov. 29, 2022

(54) SENSOR INCLUDING DEFORMABLE PART

(71) Applicants: The University of Tokyo, Tokyo (JP); KABUSHIKI KAISHA TOSHIBA, Tokyo (JP)

(72) Inventors: Isao Shimoyama, Bunkyo Tokyo (JP); Thanh-Vinh Nguyen, Bunkyo Tokyo (JP); Minh Dung Nguyen, Bunkyo Tokyo (JP); Takahiro Omori, Kawasaki Kanagawa (JP); Kazuo Watabe, Yokohama Kanagawa (JP)

(73) Assignees: University of Tokyo, Tokyo (JP); Kabushiki Kaisha Toshiba, Tokyo (JP)

( * ) Notice: Subject to any disclaimer, the term of this patent is extended or adjusted under 35 U.S.C. 154(b) by 147 days.

(21) Appl. No.: 17/018,390

(22) Filed: Sep. 11, 2020

(65) Prior Publication Data

US 2020/0408722 A1 Dec. 31, 2020

Related U.S. Application Data

(63) Continuation of application No. PCT/JP2018/041845, filed on Nov. 12, 2018.

(51) Int. Cl.
*G01N 29/24* (2006.01)
*G01N 29/14* (2006.01)

(52) U.S. Cl.
CPC ............. *G01N 29/24* (2013.01); *G01N 29/14* (2013.01)

(58) Field of Classification Search
CPC .................. G01N 29/24; G01N 29/14; G01N 2291/0289; G01N 29/04; G01N 29/223; H04R 17/00; H04R 17/02
See application file for complete search history.

(56) References Cited

U.S. PATENT DOCUMENTS

| 5,831,153 | A * | 11/1998 | Binnig | G01Q 30/14 |
| | | | | 977/860 |
| 10,234,429 | B2 * | 3/2019 | Shimoyama | H04R 23/02 |
| 2007/0230721 | A1 * | 10/2007 | White | H04R 19/005 |
| | | | | 381/166 |
| 2012/0031171 | A1 * | 2/2012 | Masuda | G01N 27/4062 |
| | | | | 73/31.05 |

FOREIGN PATENT DOCUMENTS

| JP | H10-227801 A | 8/1998 |
| JP | 6315429 B2 | 4/2018 |

* cited by examiner

*Primary Examiner* — Raul J Rios Russo
*Assistant Examiner* — Carl F. R. Tchatchouang
(74) *Attorney, Agent, or Firm* — Finnegan, Henderson, Farabow, Garrett & Dunner, LLP

(57) ABSTRACT

According to one embodiment, a sensor includes a first structure body, a second structure body, and a detector. The first structure body includes a supporter, a deformable part supported by a first portion of the supporter, and a membrane part. At least a portion of the membrane part is connected to the deformable part and a second portion of the supporter. The second structure body is connected to the first structure body. A liquid is provided between the first structure body and the second structure body. The detector outputs a signal corresponding to a deformation of the deformable part.

18 Claims, 8 Drawing Sheets

SENSOR INCLUDING DEFORMABLE PART

CROSS-REFERENCE TO RELATED APPLICATIONS

This is a continuation application of International Application PCT/JP2018/041845, filed on Nov. 12, 2018; the entire contents of which are incorporated herein by reference.

FIELD

Embodiments of the invention generally relate to a sensor.

BACKGROUND

For example, an AE (Acoustic Emission) sensor is used to detect vibrations in the acoustic and ultrasonic bands. AE is, for example, an elastic wave in the ultrasonic band generated by the occurrence and/or propagation of a crack. For example, the AE sensor is used in fatigue/degradation diagnosis, a non-destructive inspection, etc. It is desirable to stabilize the characteristics of the sensor.

DETAILED DESCRIPTION

Figure 1A:
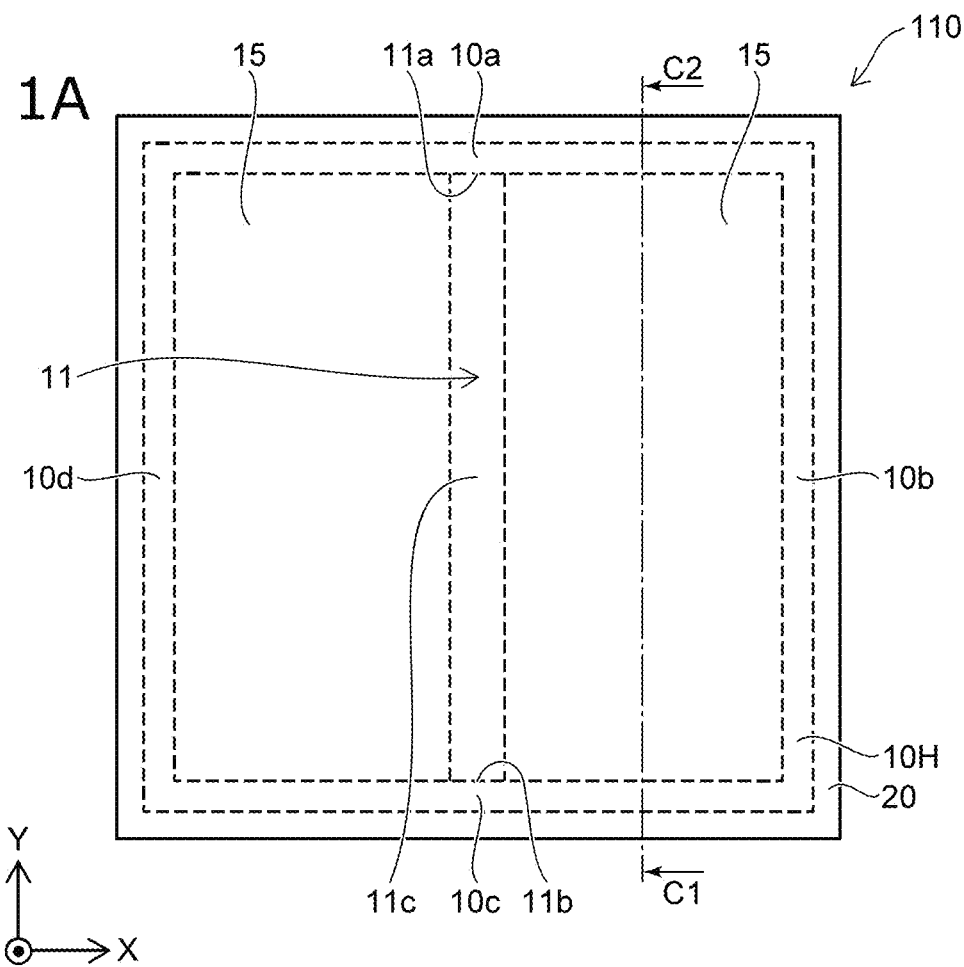
FIGS. 1A and 1B are schematic views illustrating a sensor according to a first embodiment.

According to one embodiment, a sensor includes a first structure body, a second structure body, and a detector. The first structure body includes a supporter, a deformable part supported by a first portion of the supporter, and a membrane part. At least a portion of the membrane part is connected to the deformable part and a second portion of the supporter. The second structure body is connected to the first structure body. A liquid is provided between the first structure body and the second structure body. The detector outputs a signal corresponding to a deformation of the deformable part.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

FIGS. 1A, 1B, 2A, and 2B are schematic views illustrating a sensor according to a first embodiment.

Figure 1B:
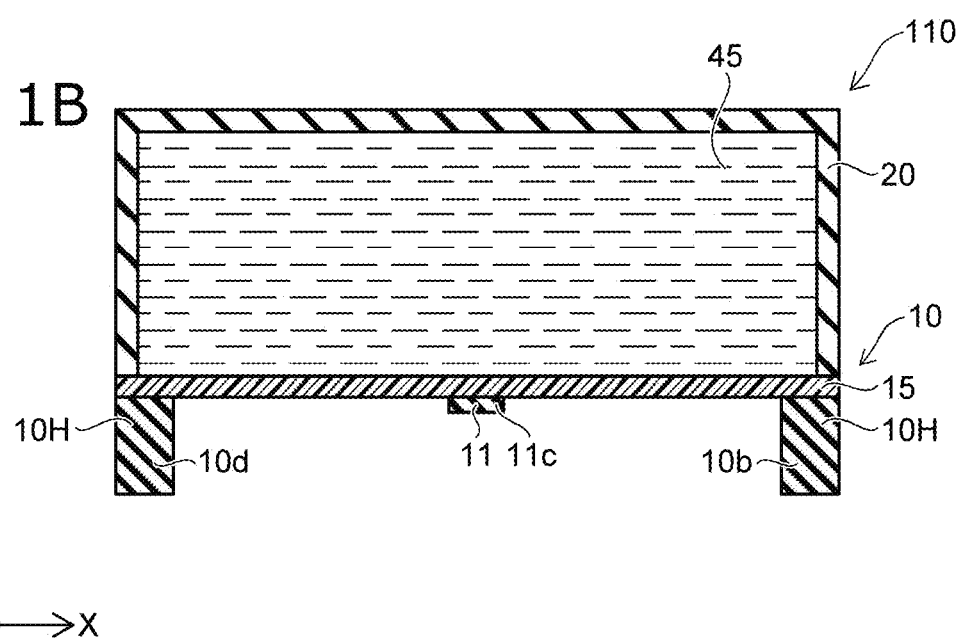
Figure 2A:
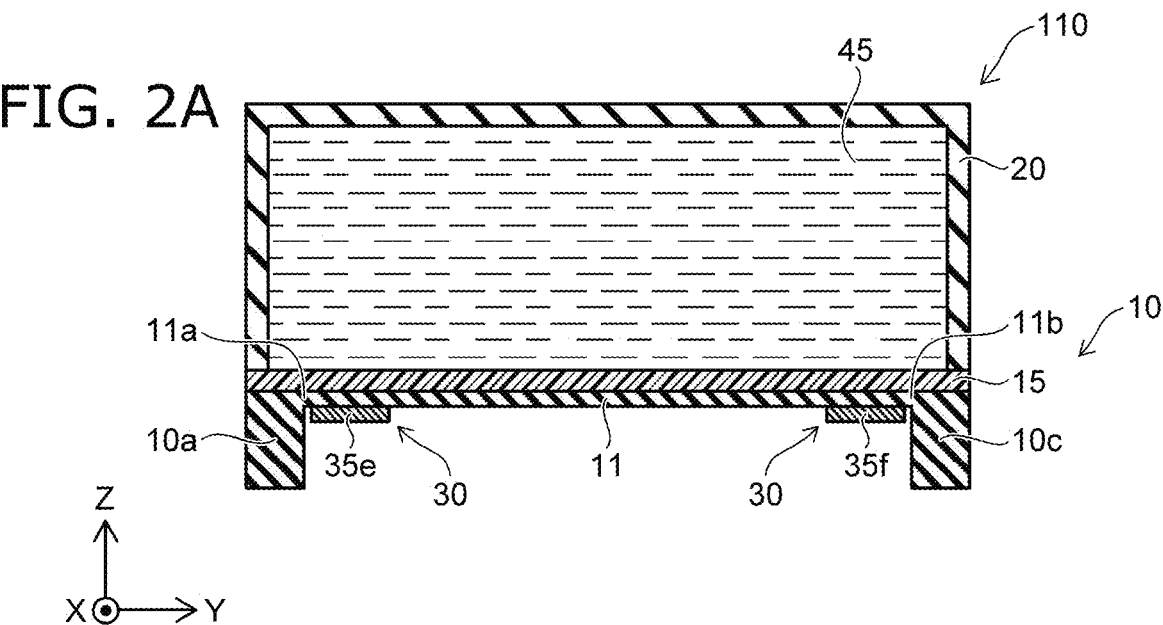
FIGS. 2A and 2B are schematic views illustrating a sensor according to the first embodiment.
Figure 2B:
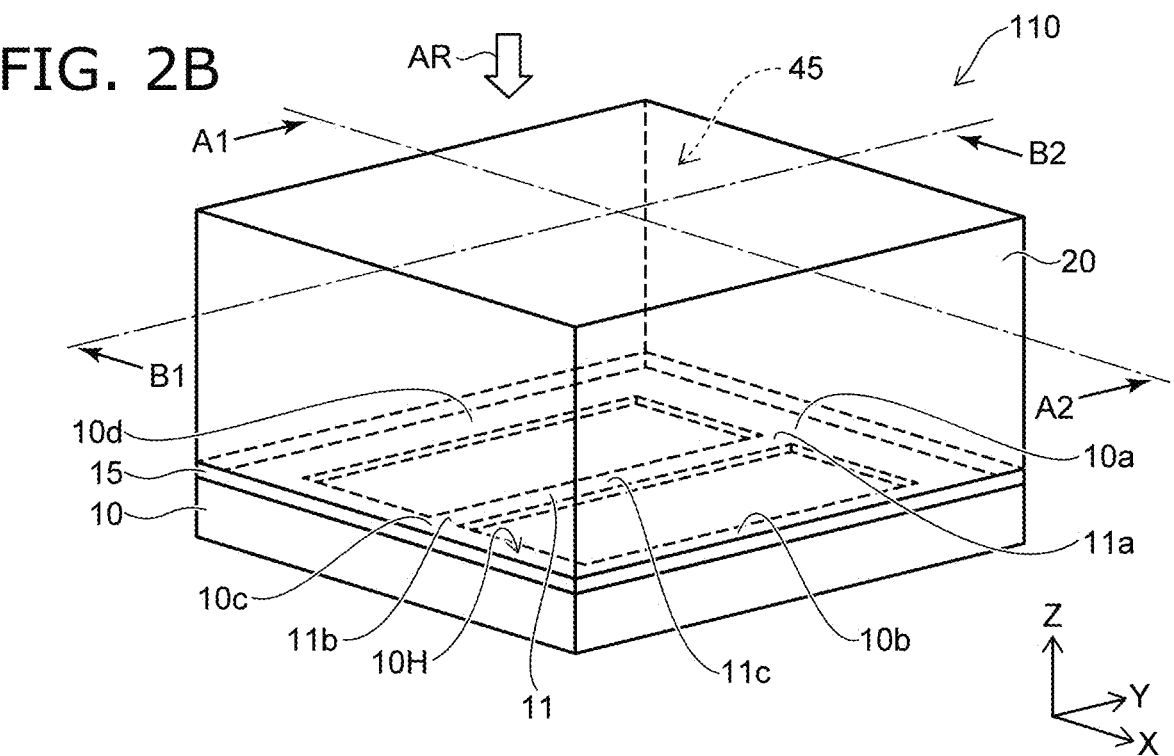

FIG. 1A is a plan view of a portion of the sensor when viewed along arrow AR of FIG. 2B. FIG. 1B is a line A1-A2 cross-sectional view of FIG. 2B. FIG. 2A is a line B1-B2 cross-sectional view of FIG. 2B. FIG. 2B is a perspective view.

The sensor 110 according to the embodiment includes a first structure body 10, a second structure body 20, and a detector 30.

As shown in FIG. 1B, the second structure body 20 is connected to the first structure body 10. A liquid 45 is provided between the first structure body 10 and the second structure body 20. The second structure body 20 is, for example, a container.

The sensor 110 is, for example, an acoustic sensor. For example, the sensor 110 detects vibrations in the acoustic and ultrasonic bands. For example, the sensor 110 detects AE. AE is, for example, an elastic wave in the ultrasonic band generated by the occurrence and/or propagation of a crack. For example, the sensor 110 is used as a sensor to detect AE. For example, the sensor 110 is used in a fatigue/degradation diagnosis to detect the occurrence of a micro defect. For example, the sensor 110 is used in a non-destructive inspection, etc.

FIG. 1A illustrates the first structure body 10. The liquid 45 is not illustrated in FIG. 1A.

As shown in FIGS. 1A and 1B, the first structure body 10 includes a supporter 10H, a deformable part 11, and a membrane part 15.

The supporter 10H includes, for example, a first portion 10a, a second portion 10b, a third portion 10c, a fourth portion 10d, etc. The supporter 10H is, for example, frame-shaped (or ring-shaped). The planar shape of the supporter 10H may be polygonal or circular (including flattened circular). The third portion 10c faces the first portion 10a. The fourth portion 10d faces the second portion 10b.

The deformable part 11 is, for example, a flexible part. The deformable part 11 is, for example, a beam.

The deformable part 11 is supported by the first portion 10a of the supporter 10H. In the example, the deformable part 11 is supported by the first portion 10a and the third portion 10c. In the example, the deformable part 11 is a fixed beam. In the embodiment, the deformable part 11 may be a cantilever beam. In such a case, the deformable part 11 is supported by the first portion 10a of the supporter 10H and separated from the third portion 10c.

In the example, the deformable part 11 includes a first end portion 11a and a second end portion 11b. The direction from the first end portion 11a toward the second end portion 11b is along a first direction (e.g., a Y-axis direction). The first end portion 11a is connected to the first portion 10a. The second end portion 11b is connected to the third portion 10c.

One direction perpendicular to the Y-axis direction is taken as an X-axis direction. A direction perpendicular to the Y-axis direction and the X-axis direction is taken as a Z-axis direction.

The direction from the first portion 10a toward the third portion 10c is along the first direction (the Y-axis direction). The direction from the second portion 10b toward the fourth portion 10d is along a second direction. The second direction crosses the first direction. The second direction is, for example, the X-axis direction. In one example, the position in the X-axis direction of the first portion 10a is, for example, the central portion of the first structure body 10. The position in the X-axis direction of the first portion 10a in the embodiment may be the end portion of the first structure body 10 or may be between the central portion and the end portion of the first structure body 10.

The deformable part 11 further includes a region 11c between the first end portion 11a and the second end portion 11b. This region 11c is displaceable in at least the Z-axis direction.

The direction from the region 11c toward the second portion 10b of supporter 10H is along the second direction (e.g., the X-axis direction). The direction from the fourth portion 10d of the supporter 10H toward the region 11c is along the second direction (e.g., the X-axis direction). The region 11c is provided between the second portion 10b and the fourth portion 10d in the second direction.

At least a portion of the membrane part 15 is connected to the deformable part 11 and the second portion 10b of the supporter 10H. In the example, the membrane part 15 is connected also to the fourth portion 10d of the supporter 10H.

For example, the membrane part 15 seals a space between the second portion 10b and the deformable part 11. For example, the membrane part 15 seals a space between the fourth portion 10d and the deformable part 11.

By providing the liquid 45 between such a first structure body 10 and such a second structure body 20, the liquid 45 is sealed with the first and second structure bodies 10 and 20. The leakage of the liquid 45 from the space surrounded with the first and second structure bodies 10 and 20 can be suppressed.

For example, a hole may be provided in the second structure body 20, the liquid 45 may be introduced via the hole, and the hole may be subsequently sealed.

The deformable part 11 is deformable. For example, an external force is applied to the second structure body 20 (e.g., the container). The external force is, for example, a sound wave, etc. The deformable part 11 deforms according to the external force. For example, the surface of the liquid 45 is displaced due to the external force, and the deformable part 11 deforms according to the displacement.

The detector 30 (referring to FIG. 2A) outputs a signal corresponding to the deformation of the deformable part 11.

The signal that is output from the detector 30 includes at least one of a change of a resistance occurring according to the deformation described above, a change of a voltage of piezoelectricity occurring according to the deformation described above, or a change of an electrostatic capacitance occurring according to the deformation described above.

In the example shown in FIG. 2A, the detector 30 includes a first electrode 35e and a second electrode 35f. In the example, the first electrode 35e is connected to a portion of the deformable part. The second electrode 35f is connected to another portion of the deformable part 11.

The deformable part 11 includes, for example, a crystal. For example, a change of the resistance according to the deformation occurs in at least a portion of the deformable part 11. For example, a voltage is generated according to the deformation in at least a portion of the deformable part 11. For example, a change of the electrostatic capacitance may occur according to the deformation in at least a portion of the deformable part 11. For example, these changes can be detected using the electrodes described above, etc.

For example, light may be irradiated on the deformable part 11. For example, the deformation of the deformable part may be detected by detecting reflected light from the deformable part 11.

In the embodiment as described above, at least portions of the membrane part 15 are connected to the deformable part 11, to the second portion 10b of the supporter 10H, and to the fourth portion 10d of the supporter 10H. The leakage of the liquid 45 from the space surrounded with the first and second structure bodies 10 and 20 can be suppressed thereby. Because the liquid 45 can be stably held, a sensor can be provided in which the characteristics can be stable.

The material of the membrane part 15 is different from the material of the deformable part 11. For example, the Young's modulus of the membrane part 15 is less than the Young's modulus of the deformable part 11. For example, the spring constant of the membrane part 15 is less than the spring constant of the deformable part 11. The membrane part 15 deforms more easily than the deformable part 11.

For example, the deformable part 11 includes silicon. The membrane part 15 includes an organic substance (e.g., a resin, etc.). The membrane part 15 may include, for example, a paraxylene polymer. The membrane part 15 may include, for example, a rubber material.

For example, the membrane part 15 is softer than the deformable part 11. Because the membrane part 15 is soft, limitations of the deformation of the deformable part 11 can be suppressed.

In the example, the membrane part 15 overlaps the deformable part 11 in the third direction (e.g., the Z-axis direction). The third direction crosses a plane including the first and second directions. In the example, the membrane part 15 is provided between the deformable part 11 and the second structure body 20. The membrane part 15 is provided between the deformable part 11 and the liquid 45.

In the sensor 110, the planar shape of the supporter 10H and the membrane part 15 is rectangular. As described below, the supporter 10H and the membrane part 15 may be, for example, circular (also including flattened circular).

Figure 3:
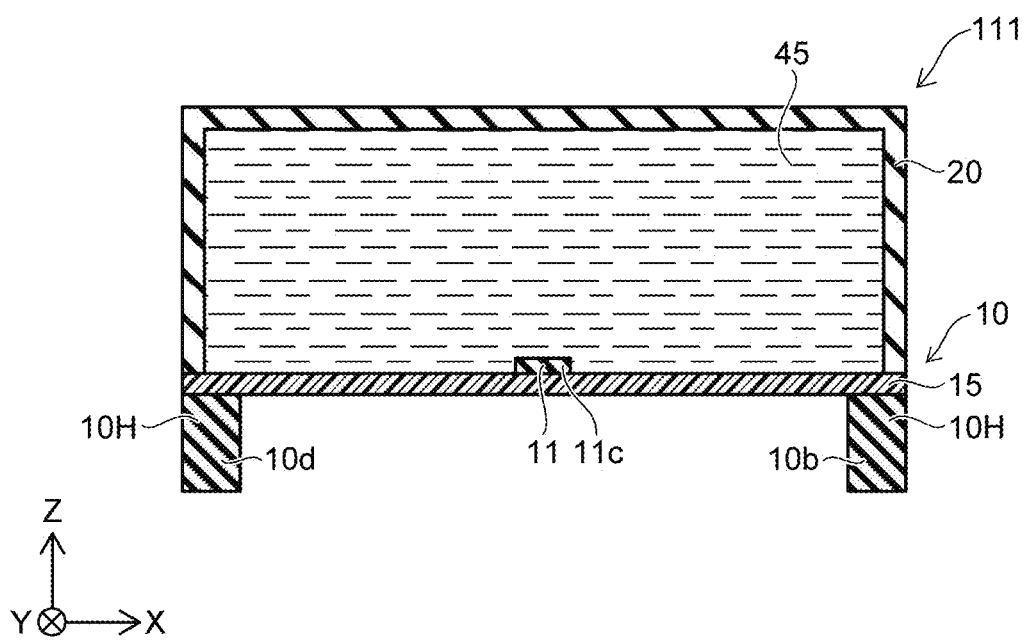
FIG. 3 is a schematic cross-sectional view illustrating a sensor according to the first embodiment.
Figure 4:
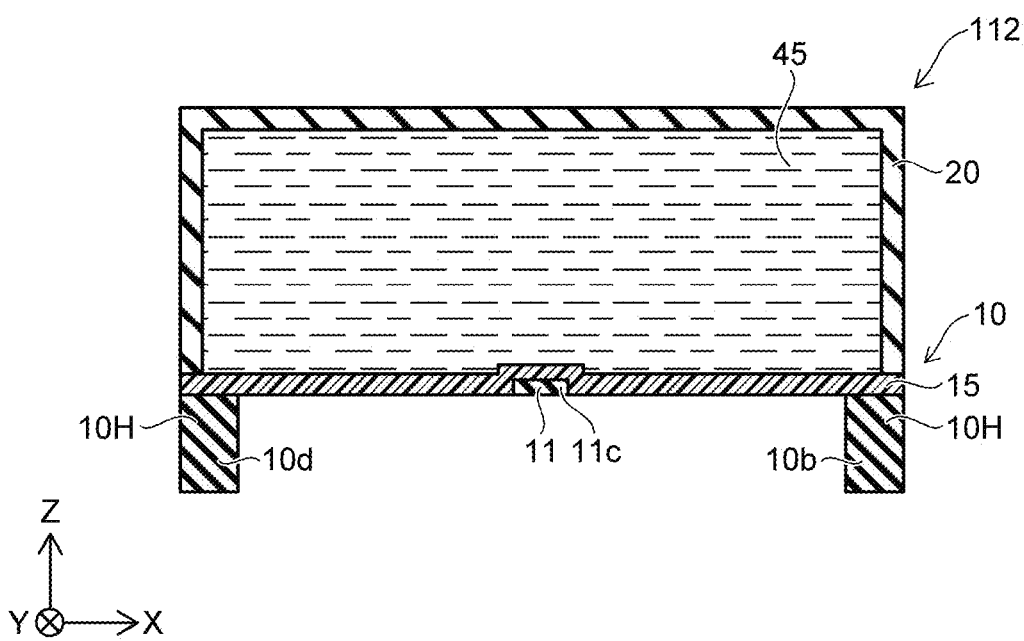
FIG. 4 is a schematic cross-sectional view illustrating a sensor according to the first embodiment.

FIGS. 3 and 4 are schematic cross-sectional views illustrating sensors according to the first embodiment.

These drawings are cross-sectional views corresponding to FIG. 1B.

In a sensor 111 as shown in FIG. 3, the deformable part 11 is provided between the membrane part 15 and the second structure body 20. The deformable part 11 is provided between the membrane part 15 and the liquid 45. In a sensor 112 as shown in FIG. 4, the membrane part 15 may be provided at the side surface of the deformable part 11. The contact area of the membrane part 15 with the deformable part 11 is increased. For example, detachment between the deformable part 11 and the membrane part 15 can be suppressed. A more stable operation is obtained.

Second Embodiment

A sensor according to a second embodiment also includes the first structure body 10, the second structure body 20, and the detector 30. Portions of the second embodiment that are different from the first embodiment will now be described.

Figure 5:
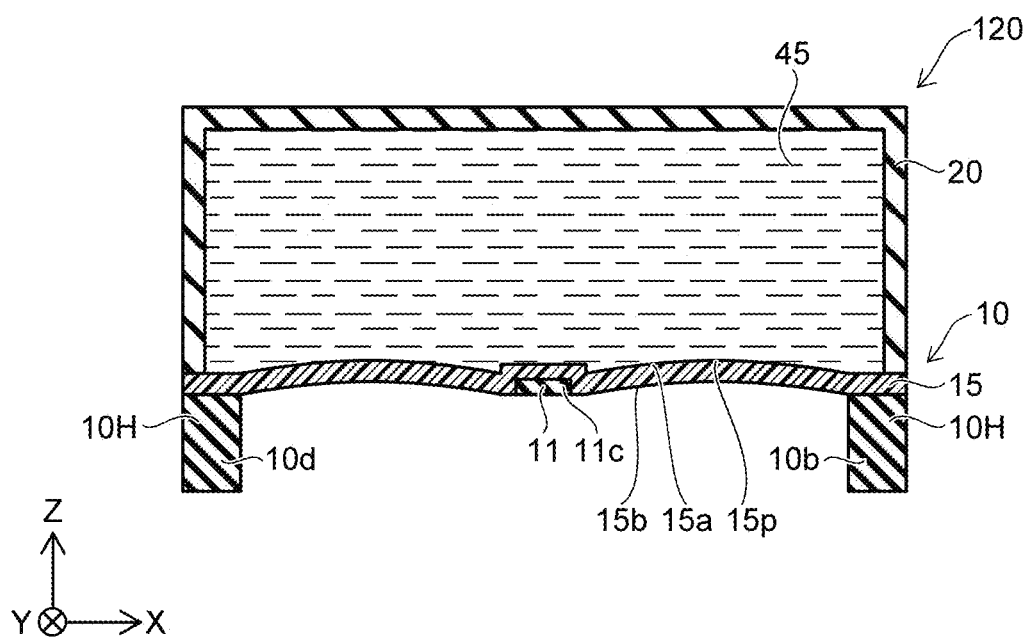
FIG. 5 is a schematic cross-sectional view illustrating a sensor according to a second embodiment.
Figure 6:
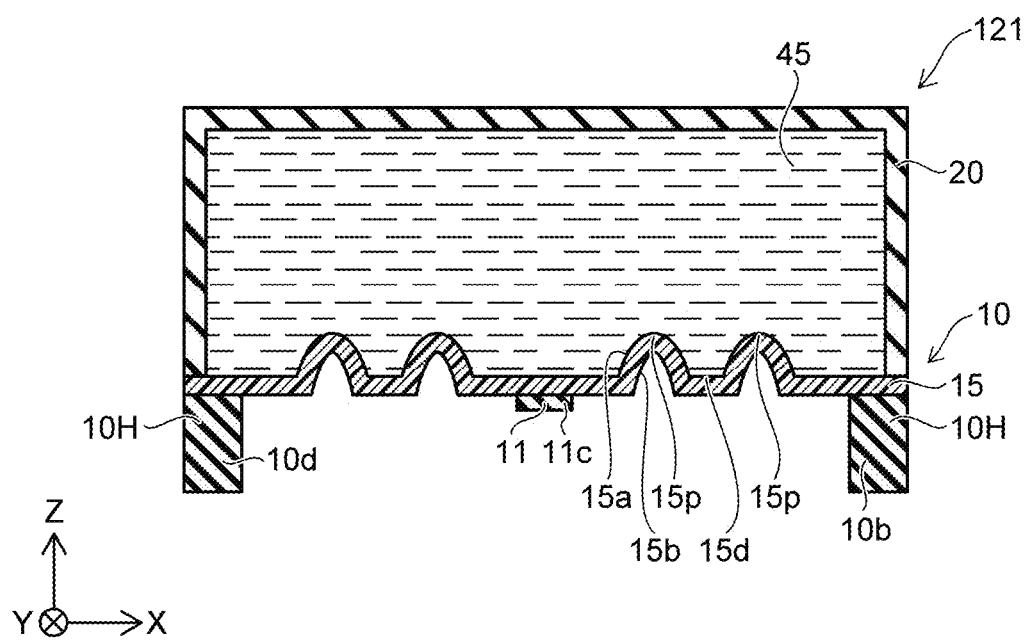
FIG. 6 is a schematic cross-sectional view illustrating a sensor according to the second embodiment.

FIGS. 5 and 6 are schematic cross-sectional views illustrating sensors according to the second embodiment.

These drawings are cross-sectional views corresponding to FIG. 1B.

In a sensor 120 as shown in FIG. 5, the membrane part 15 may be curved. The membrane part 15 includes, for example, a first surface 15a and a second surface 15b. The first surface 15a faces the liquid 45. The first surface 15a may include a protrusion 15p. The second surface 15b is curved according to the curve of the first surface 15a. The second surface 15b includes a depression corresponding to the protrusion 15p of the first surface 15a. The first surface 15a that faces the liquid 45 may include a depression. In such a case as well, the second surface 15b is curved according to the curve of the first surface 15a. The second surface 15b includes a protrusion corresponding to the depression of the first surface 15a.

In a sensor 121 as shown in FIG. 6, the first surface 15a of the membrane part 15 includes multiple protrusions 15p or multiple depressions 15d. For example, the multiple protrusions 15p may be arranged along the X-axis direction. The second surface 15b includes multiple depressions corresponding to the multiple protrusions 15p of the first surface 15a. The second surface 15b includes multiple protrusions corresponding to the multiple depressions 15d of the first surface 15a.

Figure 7:
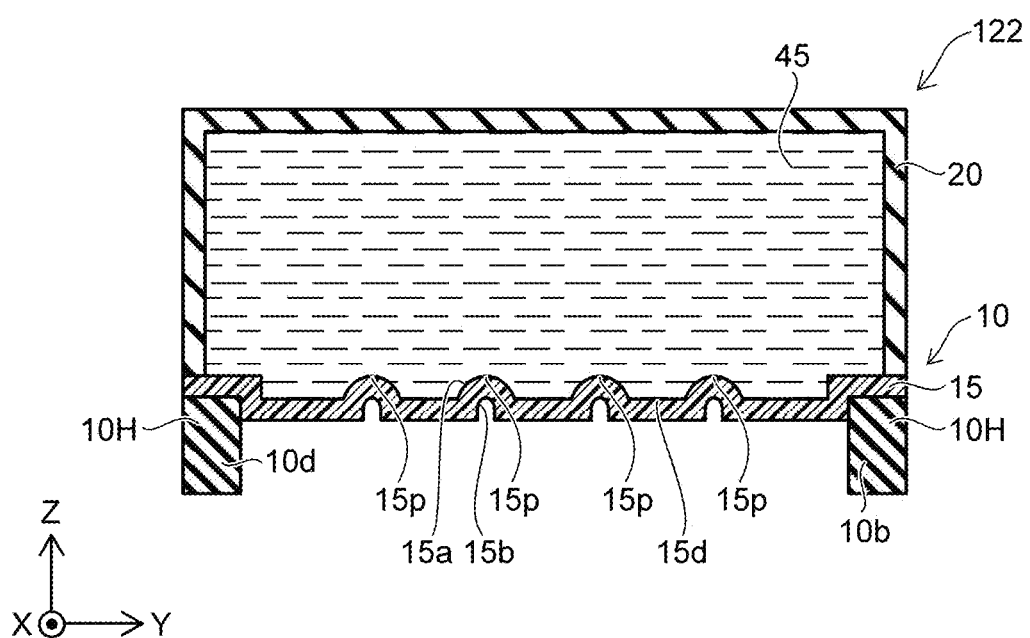
FIG. 7 is a schematic cross-sectional view illustrating a sensor according to the second embodiment.
Figure 8A:
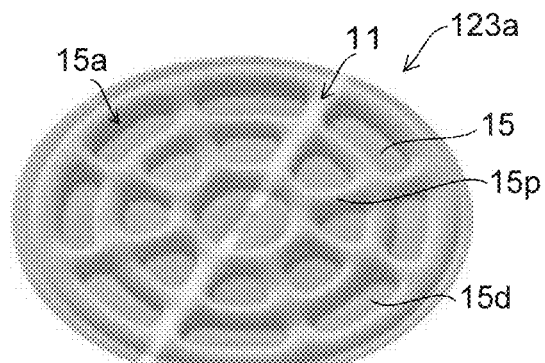
FIGS. 8A to 8F are schematic perspective views illustrating portions of sensors.
Figure 8B:
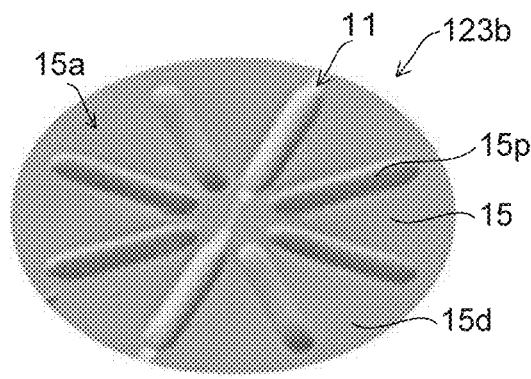
Figure 8C:
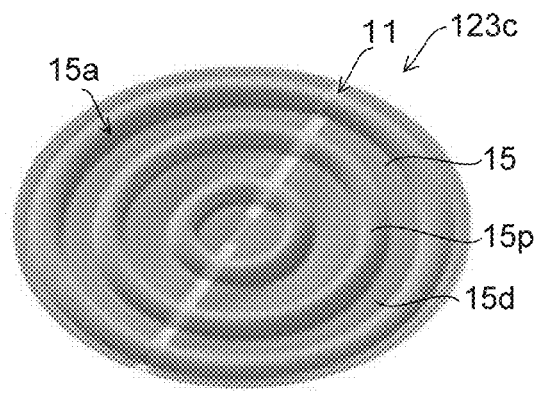
Figure 8D:
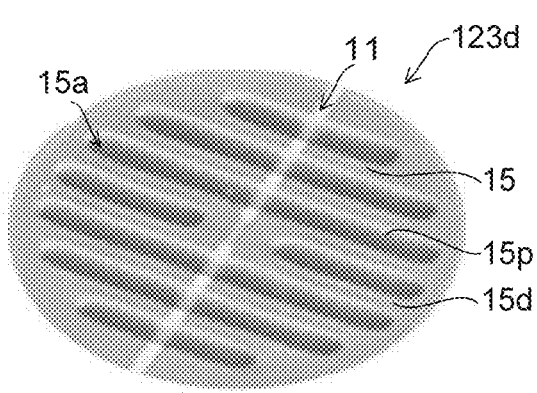
Figure 8E:
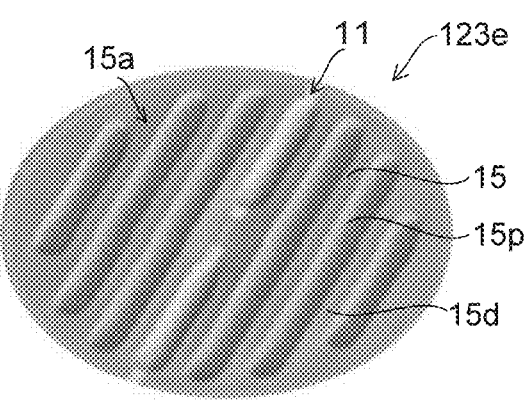
Figure 8F:
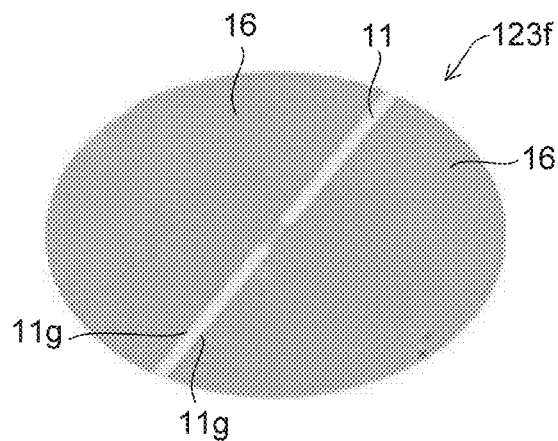

FIG. 7 is a schematic cross-sectional view illustrating a sensor according to the second embodiment.

FIG. 7 is a cross-sectional view corresponding to a line C1-C2 cross section of FIG. 1A.

In the sensor 122 as shown in FIG. 7, the first surface 15a of the membrane part 15 includes the multiple protrusions 15p or the multiple depressions 15d. For example, the multiple protrusions 15p may be arranged along the Y-axis direction.

In the sensors 120 to 122 as described above, the membrane part 15 includes one or multiple curved portions (e.g., the protrusions 15p, etc.). For example, the distance along the third direction between the position in the third direction (e.g., the Z-axis direction) of the membrane part 15 and the position in the third direction of the region 11c of the deformable part 11 described above increases and decreases. As described above, the third direction crosses a plane including the first and second directions. The multiple protrusions 15p (or the multiple depressions 15d) may be provided, and the increase and decrease of the distance described above may repeat.

The membrane part 15 deforms more easily due to such curved portions. Limitations of the deformation of the deformable part 11 can be suppressed thereby.

FIGS. 8A to 8F are schematic perspective views illustrating portions of sensors.

The membrane part 15 is provided in sensors 123a to 123e. In FIGS. 8A to 8E, the deformable part 11 is provided under the membrane part 15. The first surface 15a of the membrane part 15 is illustrated in FIGS. 8A to 8E. In the sensors 123a to 123e, the planar shape of the membrane part is circular. In such a case, the supporter 10H (not illustrated) also is circular.

On the other hand, the membrane part 15 is not provided in a sensor 123f. In the sensor 123f, a membrane 16 of the same material as the deformable part 11 is provided at the side of the deformable part 11. A gap 11g is provided between the deformable part 11 and the membrane 16. The liquid 45 (not illustrated) is exposed to the external environment at the gap 11g. The sensor 123f corresponds to a reference example.

In the sensors 123d to 123e, the first surface 15a of the membrane part 15 includes the protrusion 15p. The first surface 15a includes the multiple protrusions 15p (or the multiple depressions 15d). In the sensor 123e, the protrusion 15p extends along the deformable part 11 (the first direction). In the sensor 123d, the protrusion 15p extends along a direction (the second direction) crossing the deformable part 11.

In the sensor 123b, the multiple protrusions 15p (or the multiple depressions 15d) are arranged in a radial configuration. In the sensor 123c, the multiple protrusions 15p (or the multiple depressions 15d) are arranged in a ring configuration. In the sensor 123a, the protrusion 15p has a radial configuration and a ring configuration.

Thus, at least a portion of the membrane part 15 may have a corrugated configuration (the sensors 121 and 122 and the sensors 123a to 123e).

Figure 9A:
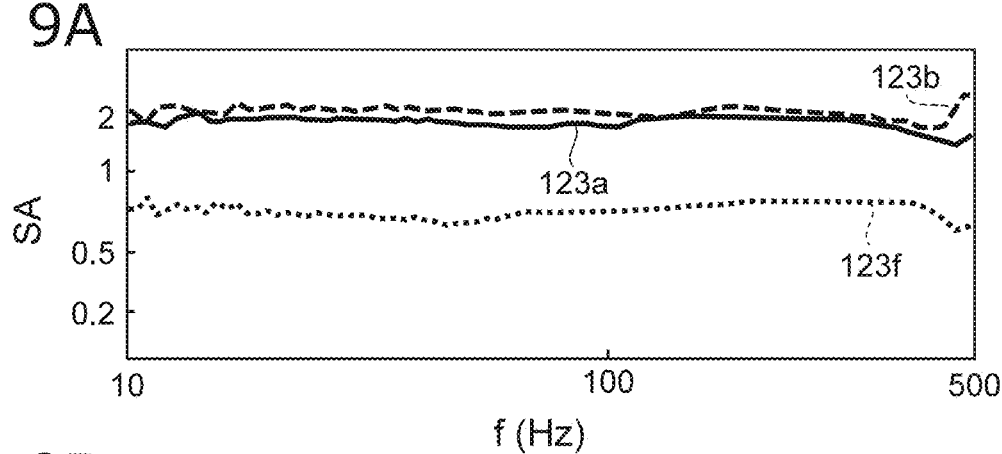
FIGS. 9A and 9B are graphs illustrating characteristics of the sensors.
Figure 9B:
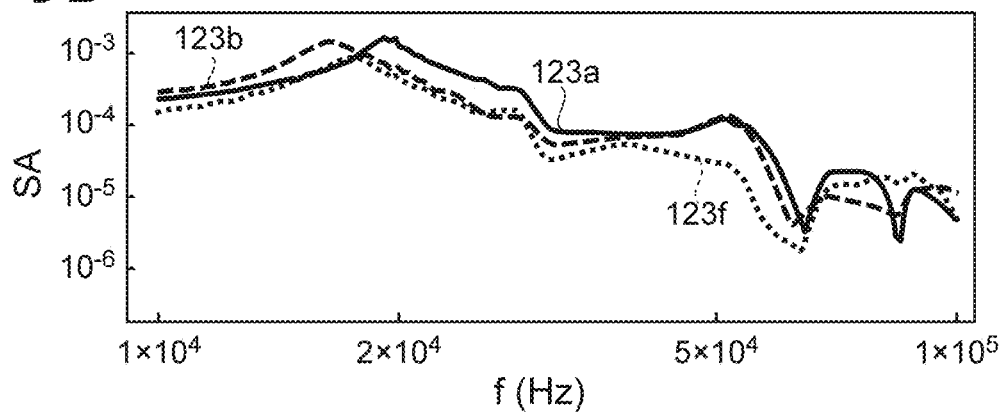

FIGS. 9A and 9B are graphs illustrating characteristics of the sensors.

In these figures, the horizontal axis is a frequency f (Hz). The vertical axis is a normalized sensitivity SA. These figures illustrate characteristics of the sensors 123a, 123b, and 123f.

It can be seen from FIG. 9A that the sensors 123a and 123b of the example have high sensitivities particularly in the low frequency domain.

In the embodiment, the membrane part 15 may be porous. The membrane part 15 may include small holes (such that the liquid 45 does not leak).

FIGS. 10A to 10F illustrate a method for manufacturing the sensor according to the embodiment.

Figure 10A:
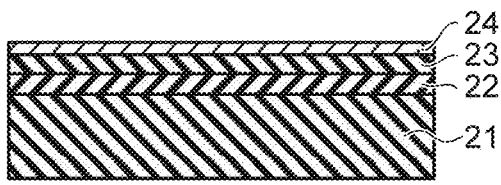
FIGS. 10A to 10F illustrate a method for manufacturing the sensor according to the embodiment.

As shown in FIG. 10A, a silicon oxide layer 22 is provided on a substrate 21 (e.g., a silicon substrate), and a silicon layer 23 is provided on the silicon oxide layer 22. A functional layer 24 is formed by introducing an impurity to a portion of the silicon layer 23. The functional layer 24 is, for example, a piezoresistive layer.

Figure 10B:
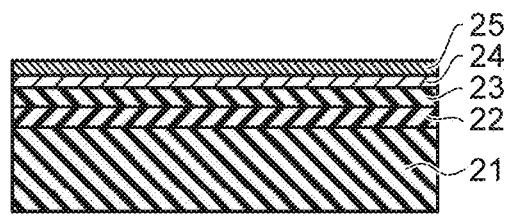

A conductive film 25 is formed as shown in FIG. 10B. The conductive film 25 includes, for example, a stacked film of a Cr membrane and a Au membrane.

Figure 10C:
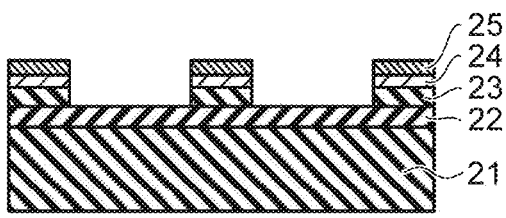

As shown in FIG. 10C, a portion of the stacked film including the conductive film 25, the functional layer 24, and the silicon layer 23 is removed. The removal includes etching using a mask. The etching includes, for example, ICP-RIE (Inductive Coupled Plasma-Reactive Ion Etching), Etc.

Figure 10D:
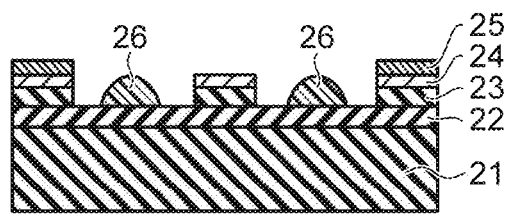

As shown in FIG. 10D, a portion of the conductive film 25 is removed, and a resin layer 26 is formed. The resin layer 26 is, for example, a photoresist. For example, the surface of the resin layer 26 is curved by reflow.

Figure 10E:
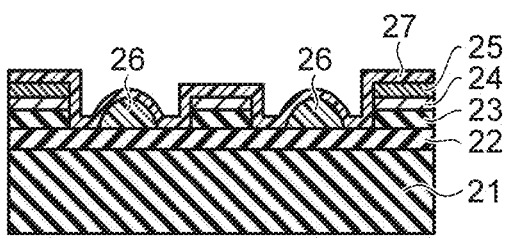

A resin film 27 is formed as shown in FIG. 10E. The resin film 27 is, for example, a paraxylene polymer. For example, the resin film 27 can be formed by vapor deposition. The resin film 27 may include, for example, a rubber material.

Figure 10F:
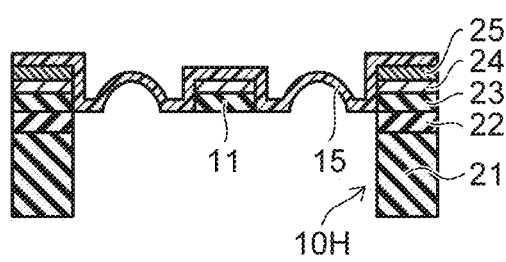

As shown in FIG. 10F, a portion of the lower surface portion of the substrate 21 is removed, and the resin layer 26 is removed. The removal of the portion of the lower surface portion of the substrate 21 includes, for example, ICP-RIE, etc. Thereby, the membrane part 15 is formed from the resin film 27. The deformable part 11 is formed from the functional layer 24 and a portion of the silicon layer 23. The supporter 10H is formed from the silicon oxide layer 22 and a portion of the substrate 21.

Any shape of unevenness (e.g., the multiple protrusions 15p or the multiple depressions 15d) can be formed in the membrane part 15 by modifying the pattern of the resin layer 26. The first structure body 10 is obtained thereby. Subsequently, the sensor is obtained by combining such a first structure body 10 and such a second structure body 20 and by introducing the liquid 45 between the first structure body 10 and the second structure body 20.

In the sensor according to the embodiment, the deformable part 11 and the membrane part 15 are provided between the liquid 45 and the gas of the external environment. The deformable part 11 (and the membrane part 15) vibrate along a surface wave of the liquid 45. The vibration response that is detected by the sensor is independent of the natural frequency of the deformable part 11 and is based on the frequency characteristics of the surface wave of the liquid 45. Therefore, compared to when the liquid 45 is not used, frequency characteristics are obtained in a wide bandwidth in the sensor according to the embodiment.

In the embodiment, the liquid 45 includes, for example, silicone oil, water, etc. The deformable part 11 includes, for example, silicon, etc. The membrane part 15 includes, for example, a paraxylene polymer. The second structure body 20 includes, for example, a polymer (e.g., PDMS (dimethylpolysiloxane)), etc. The second structure body 20 may include, for example, a metal (aluminum, iron, etc.).

The thickness (the length in the Z-axis direction) of the liquid 45 is, for example, not less than 10 μm and not more than 10 mm. The thickness (the length in the Z-axis direction) of the deformable part 11 is, for example, not less than 0.1 μm and not more than 1 μm. The thickness (the length in the Z-axis direction) of the membrane part 15 is, for example, not less than 100 μm and not more than 1 mm. The thickness of the deformable part 11 is less than the thickness of the liquid 45. The thickness of the membrane part 15 is less than the thickness of the liquid 45. By setting the thickness of the deformable part 11 to be sufficiently less than the thickness of the liquid 45, the deformable part 11 deforms along the deformation of the surface of the liquid 45.

The length (e.g., the length in the Y-axis direction) of the deformable part 11 is, for example, not less than 100 μm and not more than 500 μm. The width (e.g., the length in the X-axis direction) of the deformable part 11 is, for example, not less than 1 μm and not more than 50 μm.

In one example according to the embodiment, the deformable part 11 includes the functional layer 24 (e.g., a piezoresistive layer). The deformation of the deformable part 11 is detected utilizing the anisotropy of the piezoresistive layer. In such a case, higher sensitivity is obtained by setting the direction of the current to be along a designated crystal orientation of the piezoresistive layer. For example, when the piezoresistive layer (a silicon crystal layer) is of the n-type, the current direction and the strain generation direction are set to be along the <110> direction of the single-crystal silicon. For example, when the piezoresistive layer (the silicon crystal layer) is of the p-type, the current direction and the strain generation direction are set to be along the <100> direction of the single-crystal silicon. Higher sensitivity is obtained by such configurations. For example, the current direction corresponds to the direction from the first electrode 35e toward the second electrode 35f (referring to FIG. 2A). The strain generation direction is, for example, the direction in which the deformable part 11 extends.

For example, the signal that corresponds to the deformation of the deformable part 11 (e.g., the signal that includes the change of the resistance) is converted into a voltage by using, for example, a bridge circuit or a voltage-dividing circuit. For example, the obtained voltage is amplified by an amplifier circuit or the like and extracted as an electrical signal.

For example, problems that accompany the aging of structural components such as bridges, etc., are becoming apparent. It is desirable to develop technology for monitoring the state of structural components. For example, there is technology that detects the damage of a structural component by using an acoustic emission (AE) technique. In such technology, for example, an elastic wave that is generated due to the occurrence of an internal crack or the propagation of an internal crack is detected by a highly-sensitive sensor.

Acoustic emission is, for example, an elastic wave generated due to the propagation of a fatigue crack of a material. In an AE technique, the elastic wave is detected as a voltage signal (an AE signal) by the AE sensor. The AE sensor is, for example, a sensor that uses a piezoelectric element such as a PZT, etc.

For example, there is also a MEMS (Micro Electro Mechanical Systems)-type AE sensor. In the MEMS-type AE sensor, a liquid is provided to seal the gap formed between a cantilever and a frame. The liquid is held in a liquid holding region to be within a finite range. Due to the liquid, the cantilever vibrates along a capillary wave of the liquid. Thereby, the sensor operates as a wide-bandwidth and highly-sensitive vibration sensor.

There are cases where the liquid leaks from the gap. For example, an impact is applied to the sensor when the sensor is dropped, etc. In such a case, the gap instantaneously enlarges. Thereby, there are cases where the liquid leaks. When the liquid leaks from the gap, it is difficult to obtain a sufficient capability of the sensor.

In the embodiments, for example, the outflow of the liquid 45 can be suppressed. For example, the impact resistance of the sensor can be improved. For example, stable characteristics are easily obtained.

The reference numerals of the drawings are as follows.
10 first structure body
10H supporter
10a to 10d first to fourth portions
11 deformable part
11a, 11b first and second end portions
11c region
11g gap
15 membrane part
15a, 15b first and second surfaces
15d depression
15p protrusion
16 membrane
20 second structure body
21 substrate
22 silicon oxide layer
23 silicon layer
24 functional layer
25 conductive film
26 resin layer
27 resin film
30 detector
35e, 35f first and second electrodes
45 liquid
110 to 115, 123a to 123f sensors
AR arrow
SA sensitivity
f frequency The embodiments may include the following configurations (e.g., technological proposals).

Configuration 1
  A sensor, comprising:
    a first structure body including
      a supporter,
      a deformable part supported by a first portion of the supporter, and a membrane part, at least a portion of the membrane part being connected to the deformable part and a second portion of the supporter;

a second structure body connected to the first structure body, a liquid being provided between the first structure body and the second structure body; and a detector outputting a signal corresponding to a deformation of the deformable part.

Configuration 2

The sensor according to Configuration 1, wherein the membrane part seals a space between the second portion and the deformable part.

Configuration 3

The sensor according to Configuration 1 or 2, wherein the deformable part includes a first end portion, a second end portion, and a region between the first end portion and the second end portion, the first end portion is connected to the first portion, a direction from the first end portion toward the second end portion is along a first direction, and a direction from the region toward the second portion is along a second direction crossing the first direction.

Configuration 4

The sensor according to Configuration 3, wherein the second end portion is supported by a third portion of the supporter.

Configuration 5

The sensor according to Configuration 3 or 4, wherein the supporter further includes a fourth portion, the region is provided between the second portion and the fourth portion, and the membrane part is connected also to the fourth portion.

Configuration 6

The sensor according to Configuration 5, wherein the membrane part seals a space between the fourth portion and the deformable part.

Configuration 7

The sensor according to any one of Configurations 3 to 6, wherein the membrane part overlaps the deformable part in a third direction crossing a plane including the first and second directions.

Configuration 8

The sensor according to any one of Configurations 3 to 6, wherein a distance along a third direction between a position in the third direction of the membrane part and a position in the third direction of the region increases and decreases, and the third direction crosses a plane including the first and second directions.

Configuration 9

The sensor according to Configuration 8, wherein the increase and decrease of the distance repeats.

Configuration 10

The sensor according to any one of Configurations 3 to 9, wherein the membrane part includes a first surface facing the liquid, the first surface includes a protrusion, and the protrusion extends along the first direction.

Configuration 11

The sensor according to any one of Configurations 3 to 9, wherein the membrane part includes a first surface facing the liquid, the first surface includes a protrusion, and the protrusion extends along the second direction.

Configuration 12

The sensor according to any one of Configurations 3 to 9, wherein the membrane part includes a first surface facing the liquid, the first surface includes a plurality of protrusions or a plurality of depressions, and the plurality of protrusions or the plurality of depressions is arranged in a radial configuration.

Configuration 13

The sensor according to any one of Configurations 3 to 9, wherein the membrane part includes a first surface facing the liquid, the first surface includes a plurality of protrusions or a plurality of depressions, and the plurality of protrusions or the plurality of depressions is arranged in a ring configuration.

Configuration 14

The sensor according to any one of Configurations 1 to 13, wherein at least a portion of the membrane part has a corrugated configuration.

Configuration 15

The sensor according to any one of Configurations 1 to 14, wherein a material of the membrane part is different from a material of the deformable part.

Configuration 16

The sensor according to any one of Configurations 1 to 15, wherein a spring constant of the membrane part is less than a spring constant of the deformable part.

Configuration 17

The sensor according to any one of Configurations 1 to 16, wherein a Young's modulus of the membrane part is less than a Young's modulus of the deformable part.

Configuration 18

The sensor according to any one of Configurations 1 to 17, wherein the deformable part includes silicon, and the membrane part includes an organic substance.

Configuration 19

The sensor according to any one of Configurations 1 to 18, wherein the membrane part includes at least one of a paraxylene polymer or rubber.

Configuration 20

The sensor according to any one of Configurations 1 to 19, wherein the detector includes:

a first electrode connected to a portion of the deformable part; and a second electrode connected to an other portion of the deformable part.

According to the embodiments, a sensor can be provided in which the characteristics can be stable.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as structure bodies, supporters, liquids, detectors, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors practicable by an appropriate design modification by one skilled in the art based on the sensors described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A sensor, comprising:
    a first structure body including
        a supporter,
        a deformable part supported by a first portion of the supporter, and
        a membrane part, at least a portion of the membrane part being connected to the deformable part and a second portion of the supporter;
    a second structure body connected to the first structure body, a liquid being provided between the first structure body and the second structure body; and
    a detector outputting a signal corresponding to a deformation of the deformable part,
    wherein
        the deformable part includes a first end portion, a second end portion, and a region between the first end portion and the second end portion,
        the first end portion is connected to the first portion,
        a direction from the first end portion toward the second end portion is along a first direction, and
        a direction from the region toward the second portion is along a second direction crossing the first direction,
        a distance along a third direction between a position in the third direction of the membrane part and a position in the third direction of the region increases and decreases, and
        the third direction crosses a plane including the first and second directions.

2. The sensor according to claim 1, wherein the membrane part seals a space between the second portion and the deformable part.

3. The sensor according to claim 1, wherein the second end portion is supported by a third portion of the supporter.

4. The sensor according to claim 1, wherein the supporter further includes a fourth portion, the region is provided between the second portion and the fourth portion, and the membrane part is connected also to the fourth portion.

5. The sensor according to claim 4, wherein the membrane part seals a space between the fourth portion and the deformable part.

6. The sensor according to claim 1, wherein the membrane part overlaps the deformable part in a third direction crossing a plane including the first and second directions.

7. The sensor according to claim 1, wherein the increase and decrease of the distance repeats.

8. The sensor according to claim 1, wherein the membrane part includes a first surface facing the liquid, the first surface includes a protrusion, and the protrusion extends along the first direction.

9. The sensor according to claim 1, wherein the membrane part includes a first surface facing the liquid, the first surface includes a protrusion, and the protrusion extends along the second direction.

10. The sensor according to claim 1, wherein at least a portion of the membrane part has a corrugated configuration.

11. The sensor according to claim 1, wherein a material of the membrane part is different from a material of the deformable part.

12. The sensor according to claim 1, wherein a spring constant of the membrane part is less than a spring constant of the deformable part.

13. The sensor according to claim 1, wherein a Young's modulus of the membrane part is less than a Young's modulus of the deformable part.

14. The sensor according to claim 1, wherein the deformable part includes silicon, and the membrane part includes an organic substance.

15. The sensor according to claim 1, wherein the membrane part includes at least one of a paraxylene polymer or rubber.

16. The sensor according to claim 1, wherein the detector includes:
    a first electrode connected to a portion of the deformable part; and
    a second electrode connected to an other portion of the deformable part.

17. A sensor, comprising:
    a first structure body including
        a supporter,
        a deformable part supported by a first portion of the supporter, and
        a membrane part, at least a portion of the membrane part being connected to the deformable part and a second portion of the supporter;
    a second structure body connected to the first structure body, a liquid being provided between the first structure body and the second structure body; and
    a detector outputting a signal corresponding to a deformation of the deformable part,
    wherein
        the deformable part includes a first end portion, a second end portion, and a region between the first end portion and the second end portion,
        the first end portion is connected to the first portion,
        a direction from the first end portion toward the second end portion is along a first direction, and a direction from the region toward the second portion is along a second direction crossing the first direction, the membrane part includes a first surface facing the liquid, the first surface includes a plurality of protrusions or a plurality of depressions, and the plurality of protrusions or the plurality of depressions is arranged in a radial configuration.

18. A sensor, comprising:

a first structure body including
- a supporter,
- a deformable part supported by a first portion of the supporter, and
- a membrane part, at least a portion of the membrane part being connected to the deformable part and a second portion of the supporter;

a second structure body connected to the first structure body, a liquid being provided between the first structure body and the second structure body; and a detector outputting a signal corresponding to a deformation of the deformable part, wherein the deformable part includes a first end portion, a second end portion, and a region between the first end portion and the second end portion, the first end portion is connected to the first portion, a direction from the first end portion toward the second end portion is along a first direction, and a direction from the region toward the second portion is along a second direction crossing the first direction, the membrane part includes a first surface facing the liquid, the first surface includes a plurality of protrusions or a plurality of depressions, and the plurality of protrusions or the plurality of depressions is arranged in a ring configuration.

* * * * *